United States Patent Office 2,858,260
Patented Oct. 28, 1958

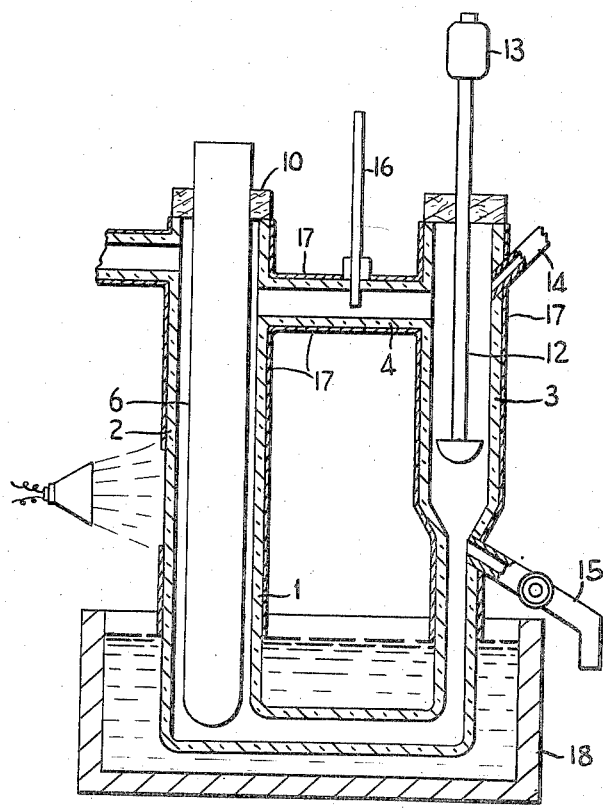

2,858,260

PREPARATION OF BENZENE HEXACHLORIDE

Joseph A. Neubauer, Pittsburgh, Pa., and Franklin Strain, Barberton, and Frederick E. Kung, Akron, Ohio, and Frederick C. Dehn, New Martinsville, W. Va., assignors to Columbia-Southern Chemical Corporation Application December 3, 1952, Serial No. 323,854

6 Claims. (Cl. 204—163)

This invention is concerned with the preparation of benzene hexachloride and has particular relation to the preparation of benzene hexachloride under conditions which will produce an optimum amount of the gamma isomer thereof.

It is known that benzene hexachloride may be prepared by reaction of benzene and chlorine in the absence of a chlorination substitution catalyst such as ferric or aluminum chloride. This reaction may be facilitated by employing actinic light, high frequency electromagnetic radiations, organic peroxides or any combinations thereof, as catalysts. Actinic light is that light, usually about 2500 to 4500 A. in wave length, which produces chemical change.

At least five isomeric forms of benzene hexachloride are known to be produced by conventional addition chlorination processes. These isomers have been designated alpha, beta, gamma, delta, and epsilon. For certain purposes, such as in the insecticidal field, it is generally recognized that the gamma isomer has particular value. Accordingly, high gamma isomer content in the benzene hexachloride is desirable. Employing the various chlorination processes available to the art, the highest gamma isomer contents which can be achieved consistently, range from about 12 to 16 percent by weight of the total benzene hexachloride produced.

According to the present invention, a novel method of preparing benzene hexachloride by addition chlorination of benzene has been found, by operation of which, gamma isomer percentages greater than those obtained by conventional processes described in the literature can be attained. Under optimum conditions, gamma isomer concentrations as high as 28 percent, and even higher, by weight of benzene hexachloride may be achieved.

Production of benzene hexachloride containing these enhanced gamma isomer contents by additive chlorination of benzene is accomplished by reacting chlorine and benzene in a liquid reaction mixture containing a compound having the general formula:

(R—O)$_2$SO$_2$ wherein R is an alkyl group having 1 or 2 carbon atoms.

The compounds conforming to the above formula which are useful in this invention include methyl sulfate and ethyl sulfate. While both of these compounds are suitable for preparing benzene hexachloride containing enhanced gamma isomer concentrations, methyl sulfate is preferred.

In accordance with the instant invention, benzene hexachloride may be prepared by introducing gaseous or liquid chlorine into a reaction mixture containing benzene and methyl sulfate while irradiating the reaction mixture with actinic light. Temperatures from about minus 60° C. to about plus 70° C. may be employed. Preferably, this process is performed in a manner such that there is unreacted chlorine in the reaction mixture, such as at least about 0.5 percent chlorine by weight of benzene and methyl sulfate. The process is, however, suitably performed with the chlorine reacting as fast as it is introduced into the reaction mixture.

Conveniently, unreacted chlorine is maintained in the reaction mixture by introducing chlorine at a rate in excess of the rate at which the chlorine is consumed. This is readily accomplished by correlating the catalytic effect of the actinic irradiation and chlorine feed rate. Thus, if it is known that a given source of actinic irradiation will promote the reaction of X grams of chlorine per minute, X+1 grams per minute of chlorine may be fed to the reaction mixture for at least the initial portion of the reaction period until the desired amount of free chlorine is present, at which time the rate may be reduced to X grams per minute.

Attainment of the optimum gamma isomer concentrations in the practice of this invention is achieved by recourse to specific set of reaction conditions. Accordingly, the preferred embodiment of this invention comprises reacting chlorine with benzene by introducing chlorine into a reaction mixture of benzene and methyl sulfate, maintaining the reaction temperature below 5° C. and above the freezing point of the reaction mixture, maintaining the chlorine concentration in the reaction mixture between 0.005 and 1.5 percent by weight of the benzene and methyl sulfate while irradiating the reaction mixture with actinic irradiation.

With respect to this preferred embodiment, it is emphasized that only by coordinated control of the temperature and chlorine concentration plus the use of dimethyl sulfate are the optimum gamma isomer concentrations attained. Thus, for example, if the chlorine concentration exceeds the specified maximum, e. g., if a chlorine concentration of 3 percent by weight of the benzene and methyl sulfate is employed, gamma isomer concentrations considerably below the optimum are obtained, even though the other reaction conditions are unchanged. Similarly, operation at temperatures above 5° C. with all other reaction conditions being maintained in accordance with the preferred embodiment will not provide gamma isomer concentrations as high as those attained below 5° C.

It should, of course, be recognized that even at conditions which do not provide optimum gamma isomer concentrations, that is, at temperatures above 5° C. and without strict chlorine concentration control, within the aforedescribed range, benzene hexachloride products containing enhanced gamma isomer contents are prepared. However, practice of the preferred embodiment provides even further increases in the gamma isomer concentration, e. g., concentrations such as 28 percent gamma isomer.

The concentration of methyl sulfate or ethyl sulfate which is used with benzene may be varied considerably. Generally, methyl sulfate or ethyl sulfate percentages from 5 to 95 percent of the benzene and sulfate may be employed. Higher percentages of the sulfate are apparently conducive to best results and 99 percent by weight of the sulfate in the reaction mixture is operative.

When practicing this invention at temperatures below the freezing point of benzene, such as below 5° C., the sulfate besides being conducive to high gamma isomer concentrations has the additional function of providing a liquid benzene solution. Normally, more sulfate is required to maintain the reaction mixture in a liquid state as lower temperatures are employed in accordance with the freezing point curve of the mixture.

As previously pointed out, high percentages of methyl or ethyl sulfate, even up to 99 percent are within the scope of this invention. Use of large amounts of the sulfate, however, necessitates the recovery and recycling of large quantities thereof. Therefore, the choice of high ratio of sulfate to benzene is often guided by balancing the respective advantages of the quality of product and operational costs. For most purposes, concentrations of about 30 to 95 percent of the sulfate, based on the sulfate and benzene, are used.

The reaction temperature can be varied from minus 60 or lower to about 70° C. In the preferred embodiment, the temperature must be maintained below 5° C., with temperatures of between 0° C. and minus 30° C. generally being most suitable. It is possible to conduct the reaction at lower temperatures, but the additional problem of adequate cooling frequently mitigates against the use of lower temperatures.

A preferred embodiment of this invention hereinbefore described may be performed by placing benzene and methyl sulfate or ethyl sulfate in a reactor, maintaining the temperature of the reaction mixture below 5° C. but above the freezing point of the mixture, introducing gaseous or liquid chlorine into this mixture while irradiating with actinic light. Preferably, this rate of addition is equal to the rate at which chlorine is consumed. The desired chlorine concentration (between 0.005 and 1.5 percent) may be achieved by introducing a pre-calculated quantity of chlorine into the reactor with the source of actinic light inoperative, and then continuing the addition with the light operative. It is likewise possible to merely introduce chlorine at a somewhat faster rate initially to provide the desired concentration with the light source operative. The concentration, once established, is maintained as nearly constant as possible through the reaction. If necessary, the rate of chlorine addition and/or the intensity of the irradiation may be varied to provide the necessary control. Chlorine concentration is checked at regular intervals by withdrawing a sample of the reaction mixture and analyzing it, or by continuous analysis, for example, employing spectroscopic analysis.

Chlorination may be continued until up to 95 percent or more of the benzene has been converted to benzene. Frequently, however, chlorination is discontinued when about 75 percent of the benzene has been converted. As the reaction proceeds, solid benzene hexachloride precipitates and at higher benzene conversions, a thick slurry may be encountered which complicates further processing, although not affecting the gamma isomer concentrations. At higher conversions when there is very little benzene present, the methyl sulfate or ethyl sulfate may more readily chlorinate and provide undesirable products.

While the invention has heretofore described with reference to actinic irradiation as the catalytic means, recourse to other catalysts in combination with or in lieu of actinic irradiation may be had. Accordingly, gamma irradiation or other high frequency electromagnetic irradiation, organic peroxides such as phenyl acetyl peroxide or trichloroacetyl peroxide, peroxydicarbonate esters such as isopropyl peroxydicarbonate may be employed to promote the reaction.

For best results, certain precautions should be taken in the performance of the invention. The presence of air or other impurities in the reaction zone is to be avoided. This is particularly true when sampling of the reaction mixture is being carried out. The benzene, chlorine, and sulfates are purified prior to reaction by suitable methods such as distillation with the ends being discarded. The reaction system is purged with nitrogen prior to introduction of chlorine and the chlorine is introduced in the presence of nitrogen. Furthermore, it is desirable that the reaction mixture be free from all substances which might promote substitution chlorination of benzene or of the sulfates.

The following examples illustrate the practice of the invention but are not to be construed as imposing any limitation thereon:

*Experiment I*

The experiment was performed with a circulatory apparatus, the description of which may be more clearly understood by reference to the accompanying drawing.

The circulatory apparatus consisted of a U-shaped glass tube 1 (similar to a Thiele melting point tube) having vertical columns 2 and 3 and a glass tubular member 4 having an outer diameter of approximately three centimeters connecting the upper portion of each vertical column of the U-shaped tube to create a continuous circular path within the apparatus. The vertical columns 2 and 3 had openings at the top of the columns. A glass protector tube 6 having an outside diameter of approximately four centimeters was placed in vertical column 2 having an outside diameter of approximately six centimeters. The glass protector tube 6 was held in place by means of a rubber stopper 10 in the opening of vertical column 2.

The apparatus was wrapped in friction tape 17 to exclude light with the exception of one portion of vertical column 2 which was not covered to provide a window. This window was approximately 3½ inches high and extended halfway around the tube. It started at a point 5½ inches from the bottom of the wide portion of the column. Actinic irradiation to promote the reaction was provided by directing the light from a Westinghouse RS 275-watt Sunlamp into the window. The distance between the closest portions of the lamp and column was ¾ of an inch.

A high-speed propeller 12 driven by a suitable motor 13 was inserted in vertical column 3. An inlet 14 for introduction of chlorine and nitrogen was provided near the top of vertical column 3 and an outlet 15 comprising a four-millimeter stopcock for removal of samples of the reaction mixture during the reaction and for removal of the product was provided near the bottom of vertical column 3. The temperature of the reaction mixture was measured by a thermometer 16 inserted in tubular member 4.

A solution of 1.208 moles (126 grams) of benzene and 4.801 moles (606 grams) of methyl sulfate was placed in the reaction zone of the apparatus. The apparatus was flushed with pyrogallol-scrubbed nitrogen for 105 minutes and cooled to minus 30° C. by inserting the lower portion of the apparatus in container 18 containing a Dry Ice-acetone mixture suitable for cooling the reaction mixture prior to commencing the introduction of chlorine.

Gaseous chlorine was passed into the reaction mixture through inlet 14 with propeller 12 operating to circulate the reaction mixture around the circular path in the reactor.

Chlorine concentration was maintained constant as nearly as possible throughout the course of the reaction period by controlling the rate at which chlorine was introduced into the reaction mixture. Samples of the reaction mixture were removed via tube 15 during the reaction period and titrated iodiometrically to determine the chlorine concentration.

At the conclusion of the reaction period, the benzene hexachloride was recovered from the solvent and benzene by distilling off unreacted benzene and methyl sulfate. The mixture was ultimately heated to a liquid temperature of 140–150° C. at a pressure of 10 millimeters of mercury for 10 minutes. The molten benzene hexachloride at 140° C. was flaked on a nickel sheet at 25° C., ground and analyzed by infra-red analysis for isomer distribution.

Several runs were made in the above manner at minus 30° C., the results of which are tabulated in the following table:

| Chlorine Concentration, Weight Percent of Sample | Total Chlorine Introduced, Gram Moles | Isomer Distribution, Percent | | | | |
|---|---|---|---|---|---|---|
| | | α | β | γ | Δ | ε |
| 0.0731 | 0.439 | 56.3 | 3.2 | 28.0 | 11.9 | 3.0 |
| 0.151 | 1.449 | 49.7 | 7.5 | 25.4 | 10.8 | 4.2 |
| 0.339 | 1.850 | 48.6 | 11.2 | 22.2 | 12.5 | 3.5 |

The chlorine concentration may be converted from a weight sample basis to percent of unreacted benzene and sulfate basis by means of the following equation:

Percent by weight of $Cl_2$ in benzene and sulfate =

$$\frac{A(B+S+C)}{B+S-\frac{78}{213}\left[C-\frac{A(B+S+C)}{100}\right]}$$

in which $A$ = percent by weight of chlorine in sample.
$B$ = grams of benzene charged.
$S$ = grams of sulfate charged.
$C$ = grams of chlorine added at time of analysis of sample.

When low conversions of benzene, e. g., when 18 percent or less of benzene is converted, and when the sulfate comprises at least 70 percent by weight of the reaction mixture, the weight sample basis for chlorine concentration is substantially the same as one based on percent by weight of unreacted benzene and sulfate in the reaction mixture.

While the invention has been described in terms of batchwise operations, it is readily employed as a continuous process. This may be accomplished by establishing an equilibrium condition in a reaction zone and continuously or periodically withdrawing a portion of the reaction mixture while continuously introducing benzene, methyl sulfate, and chlorine. The benzene and sulfate which are recovered may be conveniently recycled.

Although the present invention has been described with reference to the specific details of certain embodiments thereof, it is not intended that such details shall be regarded as limitations upon the scope of the invention except insofar as included in the accompanying claims.

We claim:

1. In the process of preparing benzene hexachloride by catalytic additive chlorination of benzene, the step of reacting chlorine and benzene in a liquid reaction mixture containing a compound selected from the group consisting of methyl sulfate and ethyl sulfate.

2. The process of claim 1 wherein the compound is methyl sulfate.

3. A method of preparing benzene hexachloride which comprises introducing chlorine into a liquid mixture of benzene and a compound selected from the group consisting of methyl sulfate and ethyl sulfate while irradiating said mixture with actinic light.

4. A method of preparing benzene hexachloride by catalytic additive chlorination of benzene which comprises reacting chlorine and benzene in a liquid reaction mixture containing benzene and a compound selected from the group consisting of methyl sulfate and ethyl sulfate and maintaining the temperature of said mixture below 5° C. and above the freezing point of the mixture.

5. The method of claim 4 wherein the sulfate is methyl sulfate.

6. The method of claim 4 wherein the reaction mixture is irradiated with actinic light.

References Cited in the file of this patent

UNITED STATES PATENTS

| 2,628,260 | Britton et al. | Feb. 10, 1953 |
| 2,717,238 | Neubauer et al. | Sept. 6, 1955 |

FOREIGN PATENTS

| 500,994 | Belgium | Aug. 1, 1951 |
| 678,577 | Great Britain | Sept. 3, 1952 |

OTHER REFERENCES

Degering et al.: "An Outline of Organic Chemistry," third edition, page 86 (1939).